Nov. 6, 1923.　　　　　E. G. GUNN　　　　　1,473,092
MOTOR VEHICLE
Filed Nov. 14, 1919
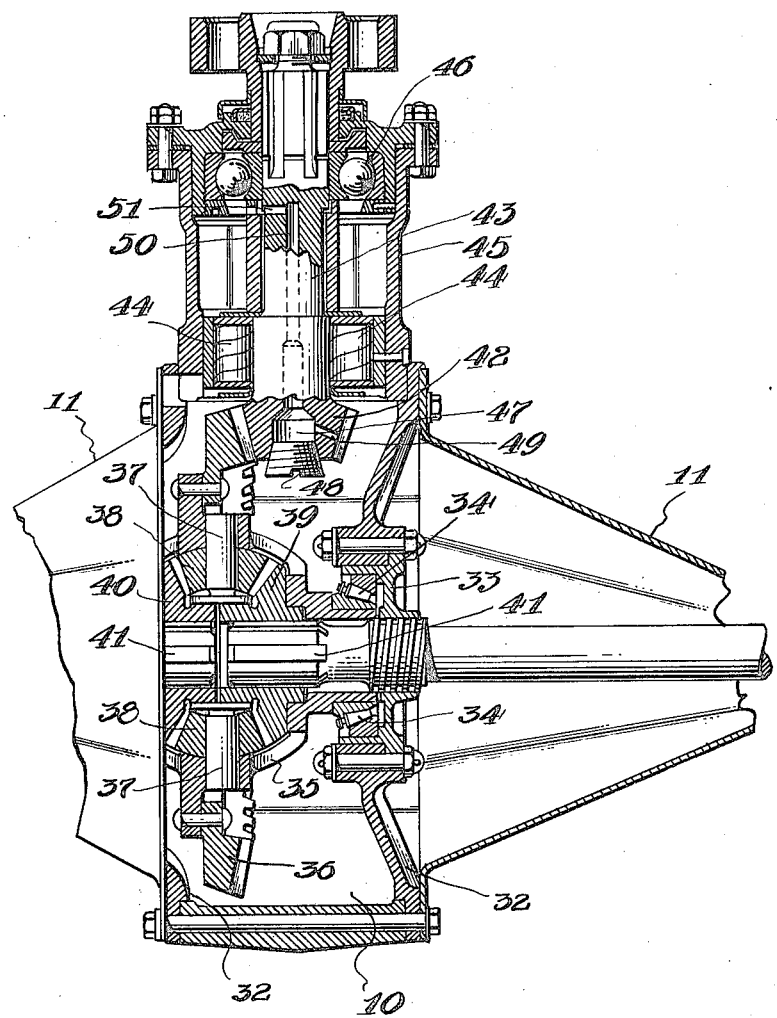
Inventor
Earl G. Gunn.
By Millon Tibbitts
Attorney Patented Nov. 6, 1923.

1,473,092

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed November 14, 1919. Serial No. 338,106.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and particularly to the axle and means for lubricating the gearing and bearings therein.

One of the objects of the invention is to provide novel and improved means for lubricating the bearings of the driving shaft of a motor vehicle axle.

Further objects will appear from the description taken in connection with the accompanying drawing which form a part of the specification and in which I have shown in section a portion of my improved axle construction.

The improved axle comprises a central casing 10 and a pair of supporting casings 11, which casings 11 have secured to their inner enlarged portions a pair of castings 32 which in turn have bolted thereto castings 33. These latter castings 33 support roller bearings 34 upon which is mounted the central rotatable differential housing 35. The housing 35 has secured thereto a driving gear 36 and pinion shafts 37 upon which are mounted differential pinions 38, the latter pinions meshing respectively, with pinions 39 and 40 which are slidably connected with the axle shafts as shown at 41.

The gear 36 is driven by a gear 42, which is carried by the rear end of the driving shaft 43, this latter shaft being connected in any suitable manner to the power transmission shaft which receives its rotation from the motor. The shaft 43 is suitably supported in the roller bearings 44 carried by a casing 45, this casing being secured to the central casting 32 above mentioned. The casing 45 also carries at its opposite end ball bearings 46 and these bearings are lubricated in the following manner. The pinion 42 is recessed as shown at 47, the plug 48 having screw threaded engagement with this recess and forming an oil pocket in the gear 42. As is well known, the casing 11 is partially filled with lubricant and this lubricant is carried around, more or less, by the gear 36 and in order to utilize this lubricant for lubricating the ball bearing 46 an oil conduit 49 is provided between two adjacent teeth of the gear 42, this conduit leading to the pocket formed by the recess 47.

The shaft 43 is bored out longitudinally as shown at 50, the rear end of the bore being connected by laterally extending conduit 51 with the ball bearings 46. Thus it will be seen that as the lubricant is carried around by the gear 36, a portion of it will be squeezed between the teeth and through the longitudinal recess or bore 50 to the conduit 51 and thence to the ball bearings 46.

From the above description, it will be seen that simple and efficient means has been provided for lubricating the bearings for the drive shaft and it should also be noted that the central portion of the axle is lubricated entirely independently of the outer portion.

While I have in the above specification described one specific embodiment of my invention it will be understood that the invention is capable of modification and that modifications and changes may be made without departing from the spirit or scope of the invention as expressed in the following claims.

What I claim and desire to secure by Letters Patent is:

1. In an axle, in combination, a supporting casing, an axle shaft carried thereby, driving gearing carried by said shaft, a drive shaft, gearing connecting said drive shaft with said first mentioned drive gearing, bearing for said drive shaft and means for conducting lubricant through the gearing carried by said drive shaft to said bearing.

2. In an axle, in combination, a supporting casing, differential gearing carried thereby, a driving gear adapted to mesh with said differential gearing, a driving shaft operatively connected to said driving gear and an oil conduit for conducting oil from the space between the adjacent teeth on said driving gear through said drive shaft.

3. In an axle, in combination, a drive shaft, bearings for said drive shaft, differential gearing, a driving gear carried by said drive shaft and meshing with said differential gearing and an oil conduit for conducting oil squeezed between the teeth of said driving gear to the bearings of said drive shaft.

4. In an axle, in combination, a supporting casing, bearings carried thereby, a shaft mounted in said bearings, a second shaft mounted in said casing, gearing connecting said shafts, and means associated with the gearing for conducting lubricant through the first named shaft to the bearings therefor.

5. In an axle, in combination, a supporting casing, bearings carried thereby, a shaft mounted in said bearings, a second shaft mounted in said casing, gearing connecting said shafts, and means including a portion of said gearing for conducting lubricant through the first named shaft to the bearings therefor.

6. In an axle, in combination, a casing, gearing carried thereby, a drive shaft mounted in bearings carried by said casing, a gear secured to said shaft and meshing with said gearing, and means including said gear for conducting lubricant therethrough to the bearings of said shaft.

7. In an axle, in combination, a casing, gearing carried thereby, a drive shaft mounted in bearings carried by said casing, a gear secured to said shaft and meshed with said gearing, and means including said gear for forcing the lubricant under pressure through the gear and drive shaft to said bearings.

8. In an axle, in combination, a supporting casing, bearings carried thereby, a shaft mounted in said bearings, a gear on said shaft, and means associated with the gear for forcing lubricant through the gear and the shaft to the bearings.

In testimony whereof I affix my signature.

EARL G. GUNN.